(12) United States Patent
Baba

(10) Patent No.: US 9,781,304 B2
(45) Date of Patent: Oct. 3, 2017

(54) INFORMATION PROCESSING APPARATUS FOR NEAR FIELD WIRELESS COMMUNICATION SELECTS PROCESS TO EXECUTE BASED ON SCREEN ID OF DISPLAYED SCREEN, METHOD FOR CONTROLLING THE SAME, AND STORAGE MEDIUM

(71) Applicant: CANON KABUSHIKI KAISHA, Tokyo (JP)

(72) Inventor: Tatsuru Baba, Beppu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/990,681

(22) Filed: Jan. 7, 2016

(65) Prior Publication Data
US 2016/0119504 A1  Apr. 28, 2016

Related U.S. Application Data

(63) Continuation of application No. 14/461,254, filed on Aug. 15, 2014, now Pat. No. 9,264,580.

(30) Foreign Application Priority Data

Aug. 20, 2013 (JP) .................................. 2013-170496

(51) Int. Cl.
*H04N 1/44* (2006.01)
*G03G 15/00* (2006.01)
(Continued)

(52) U.S. Cl.
CPC ......... *H04N 1/4433* (2013.01); *G03G 15/502* (2013.01); *G06K 15/005* (2013.01); (Continued)

(58) Field of Classification Search
CPC ............. H04N 1/4433; H04N 1/00474; H04N 1/00307; H04N 1/00114; H04N 1/00411; (Continued)

(56) References Cited

U.S. PATENT DOCUMENTS

2004/0054783 A1* 3/2004 Takemura ............... H04N 5/765
709/227
2010/0188697 A1* 7/2010 Maeda .................. G06F 3/0482
358/1.15
(Continued)

FOREIGN PATENT DOCUMENTS

CN     101416412 A    4/2009
CN     102016869 A    4/2011
(Continued)

*Primary Examiner* — Marcellus Augustin
(74) *Attorney, Agent, or Firm* — Canon U.S.A., Inc. IP Division

(57) ABSTRACT

There is provided an information processing apparatus and a control method thereof. The information processing apparatus and a control method acquires user information from an external apparatus by using near field wireless communication, determines how to handle the acquired user information according to a type of a screen displayed by a display unit. For example, when the displayed screen is an authentication screen, authentication processing is executed by using the acquired user information.

12 Claims, 21 Drawing Sheets

(51) Int. Cl.
*G06K 15/00* (2006.01)
*H04N 1/00* (2006.01)

(52) U.S. Cl.
CPC ..... *H04N 1/00114* (2013.01); *H04N 1/00204* (2013.01); *H04N 1/00307* (2013.01); *H04N 1/00342* (2013.01); *H04N 1/00408* (2013.01); *H04N 1/00411* (2013.01); *H04N 1/00413* (2013.01); *H04N 1/00474* (2013.01); *H04N 1/00501* (2013.01); *H04N 1/00954* (2013.01); *H04N 1/4406* (2013.01); *G03G 2215/00092* (2013.01); *H04N 2201/006* (2013.01); *H04N 2201/0039* (2013.01); *H04N 2201/0075* (2013.01); *H04N 2201/0094* (2013.01)

(58) Field of Classification Search
CPC ........... H04N 1/00342; H04N 1/00413; H04N 2201/0039; H04N 2201/0094; H04N 2201/0075; H04N 2201/006
USPC .................................................. 358/1.1–3.23
See application file for complete search history.

(56) References Cited

U.S. PATENT DOCUMENTS

| | | | | |
|---|---|---|---|---|
| 2014/0085654 | A1* | 3/2014 | Miyazaki ........... | H04N 1/00209 358/1.13 |
| 2014/0126011 | A1* | 5/2014 | Park ................... | H04N 1/00106 358/1.15 |
| 2014/0268221 | A1* | 9/2014 | Sako .................. | H04N 1/00204 358/1.15 |

FOREIGN PATENT DOCUMENTS

| | | |
|---|---|---|
| CN | 102932589 A | 2/2013 |
| JP | 2005332072 A | 12/2005 |
| JP | 2007122279 A | 5/2007 |
| JP | 2009-038795 A | 2/2009 |
| JP | 2010028367 A | 2/2010 |
| JP | 2010041665 A | 2/2010 |
| KR | 10-2011-0119564 A | 11/2011 |

* cited by examiner

1000 — Addr: 0xAAAA_B000
1002 — Addr: 0xAAAA_B004

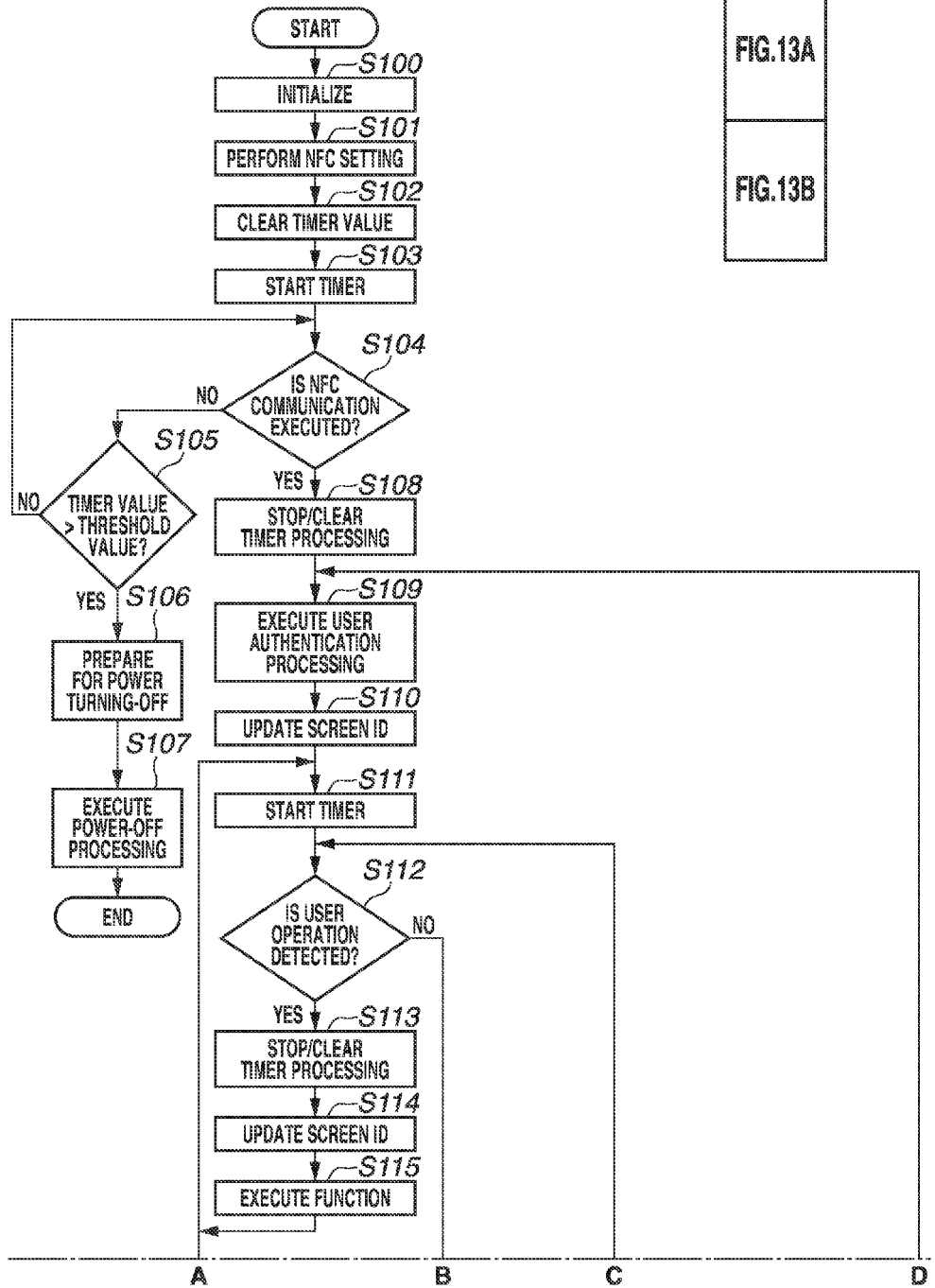

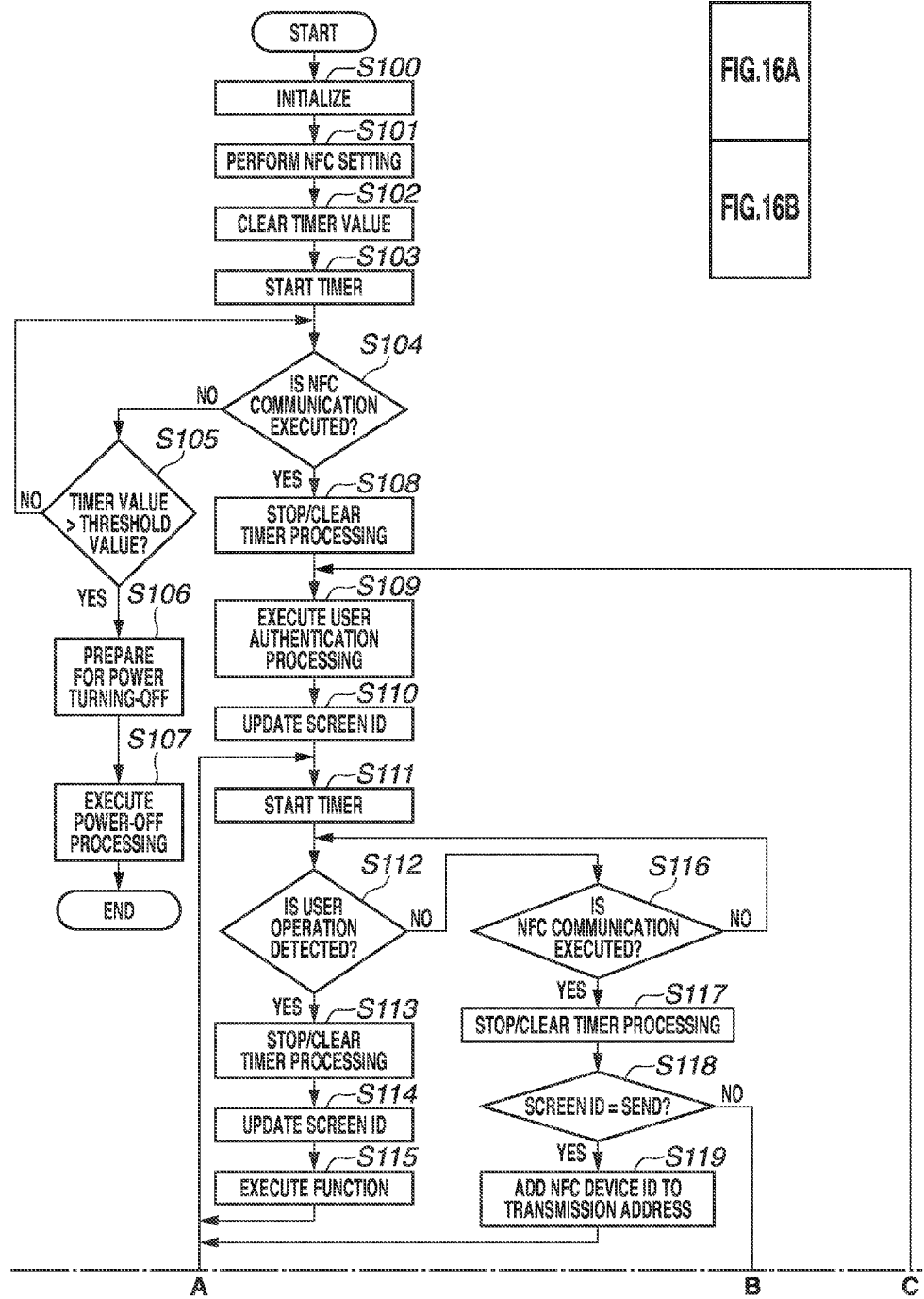

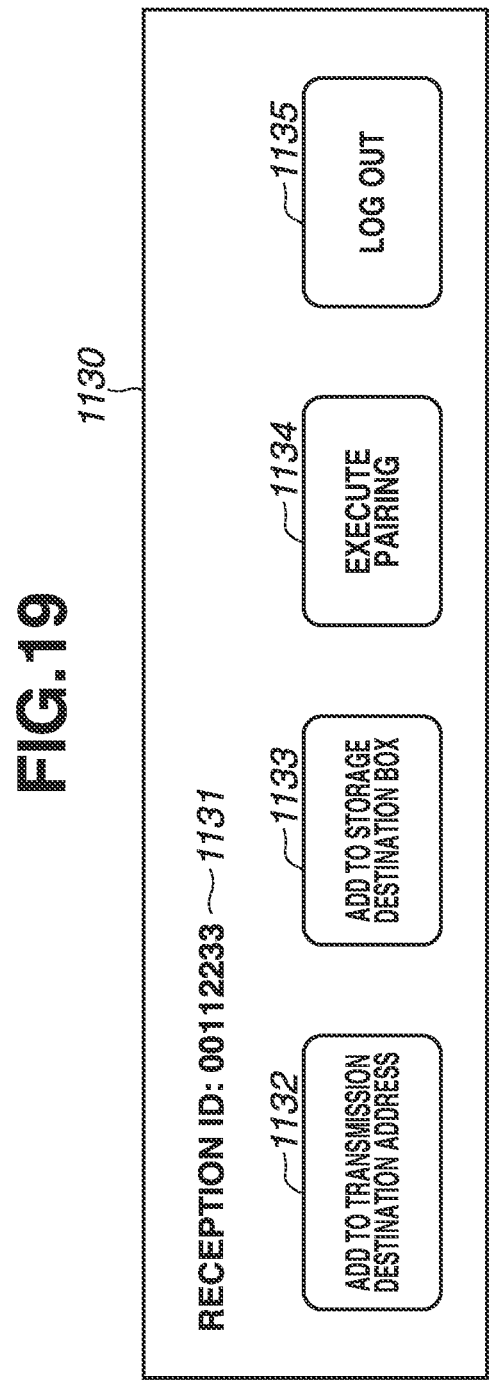

INFORMATION PROCESSING APPARATUS FOR NEAR FIELD WIRELESS COMMUNICATION SELECTS PROCESS TO EXECUTE BASED ON SCREEN ID OF DISPLAYED SCREEN, METHOD FOR CONTROLLING THE SAME, AND STORAGE MEDIUM

CROSS-REFERENCE TO RELATED APPLICATIONS

This application is a Continuation of U.S. patent application Ser. No. 14/461,254 filed Aug. 15, 2014 (now U.S. Pat. No. 9,264,580), which claims priority from Japanese Patent Application No. 2013-170496 filed Aug. 20, 2013. Each of U.S. patent application Ser. No. 14/461,254 and Japanese Patent Application No. 2013-170496 is hereby incorporated by reference herein in its entirety.

BACKGROUND OF THE INVENTION

1. Field of the Invention

The present invention relates to an information processing apparatus, a method for controlling the same, and a storage medium.

2. Description of the Related Art

Recently, a technique referred to as near field communication (NFC) that is one of near field wireless communication means has started to be mounted in a mobile terminal such as a smartphone or a tablet personal computer (PC). In specifications of the NFC, three functions are defined. The first is a reader/writer function that enables reading/writing of data from/into a NFC card or a NFC tag. The second is a peer-to-peer function that enables transmission/reception of various data via the NFC. The third is a card emulation function that enables execution of an operation similar to that of the NFC tag.

In an image forming apparatus, an authentication function achieved thus far by using a radio frequency identification (RFID) tag to control permission/inhibition for a user can be replaced by the NFC. The NFC is usable in various devices. Accordingly, a wide variety of data including identification information, personal information such as a telephone number to device information such as an Internet Protocol (IP) address, is transmitted via the NFC. Even when the same information (e.g., ID information) is exchanged between NFC-mounted devices, the ID information may be used for the authentication function on a certain condition while the ID information may be used for registering user information on another condition. In the NFC, a communicable distance is about several centimeters (cm). Thus, data exchange can be performed between the two NFC-mounted devices by an intuitive operation referred to as touching for bringing the NFC-mounted devices into contact with each other. As a technique taking advantage of these features, Japanese Unexamined Patent Application Publication (Translation of PCT Application) No. 2009-531888 discusses a technique that transmits an action related to an object via the NFC to execute the action when a user selects an object displayed on a display in an NFC device that includes the display.

However, according to the technique discussed in Japanese Unexamined Patent Application Publication (Translation of PCT Application) No. 2009-531888, if a object to be executed is selected by a user, the user cannot perform an intuitive operation using the NFC.

SUMMARY OF THE INVENTION

The present invention is directed to a technique capable of providing an intuitive operation of an information processing apparatus using a near field wireless communication to a user.

According to an aspect of the present invention, an information processing apparatus capable of performing near field wireless communication includes a display unit configured to display a screen, an acquisition unit configured to acquire user information from an external apparatus by using the near field wireless communication, and a processing unit configured to determine handling of the user information acquired by the acquisition unit according to a type of the screen displayed by the display unit.

Further features and aspects of the present invention will become apparent from the following detailed description of exemplary embodiments with reference to the attached drawings.

BRIEF DESCRIPTION OF THE DRAWINGS

FIG. 19 is a diagram illustrating an example of a menu screen for selecting addition of a transmission destination address, a storage destination box, or execution of pairing based on NFC device ID information.

DESCRIPTION OF THE EMBODIMENTS

Figure 1:
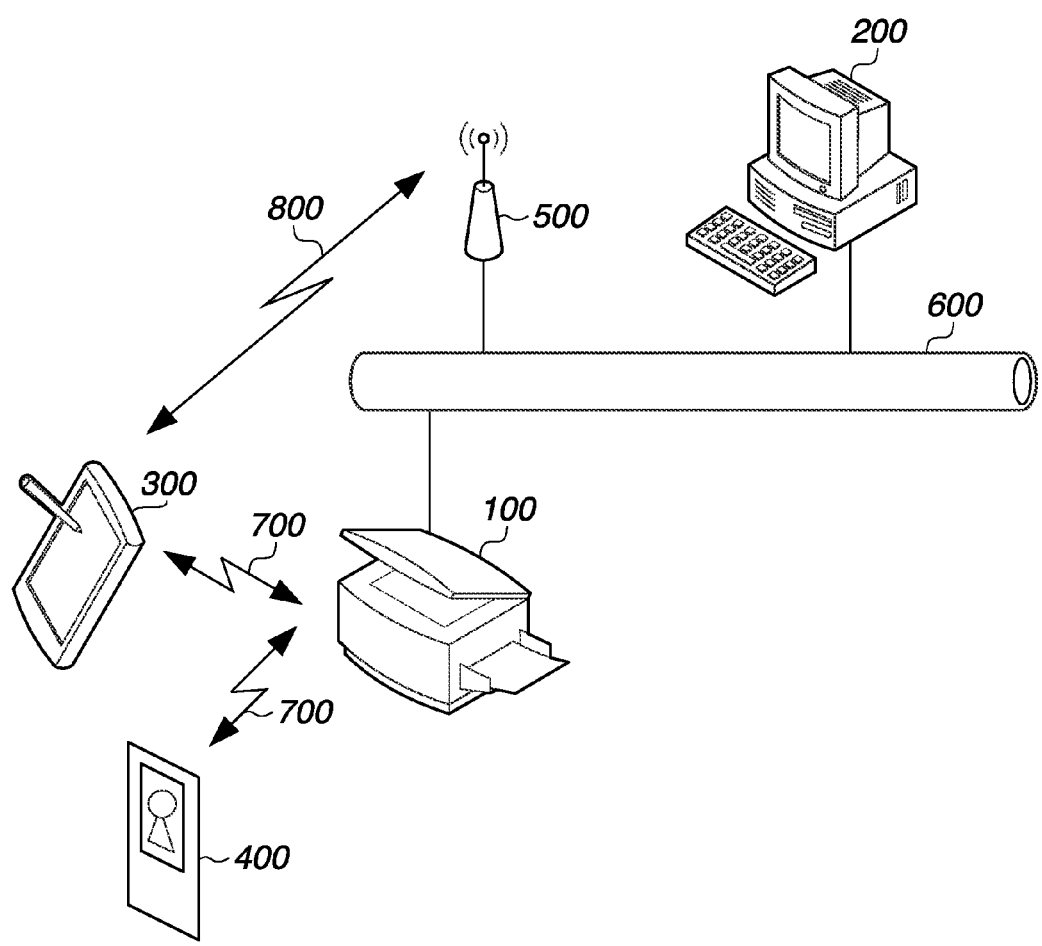
FIG. 1 is a diagram illustrating an example of a system configuration.

Various exemplary embodiments, features, and aspects of the invention will be described in detail below with reference to the drawings.

Hereinafter, a first exemplary embodiment of the present invention will be described referring to the drawings.

FIG. 1 is a diagram illustrating an example of a system configuration.

The system includes an image forming apparatus 100, a personal computer (PC) 200, a mobile terminal 300, an NFC card 400, a wireless local area network (LAN) access point 500, and a LAN 600.

The image forming apparatus 100 is an example of an information processing apparatus that has a copy function, a print function, a send function, and a box function. Specific processes of the respective functions are as described below.

The copy function is for copying a paper document.

The print function is for printing a print job received via the LAN 600.

The send function (transmission function) is for transmitting computerized document data to a designated address. The box function (file storage function) is for storing the computerized document data or computerized document data received via the LAN 600.

The PC 200 can transmit a print job to the image forming apparatus 100 based on document data via the LAN 600, and the image forming apparatus 100 can refer to the computerized document data.

The mobile terminal 300 is a portable information processing terminal that has an NFC communication 700 function and a wireless LAN communication 800 function, which may correspond to a smartphone or a tablet PC. The mobile terminal 300 can communicate with the image forming apparatus 100 via the NFC communication 700. Information transferred between the mobile terminal 300 and the image forming apparatus 100 may be, for example, an IP address or user ID information. The mobile terminal 300 can execute printing of image data by transmitting the image data in the mobile terminal 300 to the image forming apparatus 100 via the wireless LAN communication 800. The mobile terminal 300 can refer to the document data computerized by the image forming apparatus 100 via the wireless LAN communication 800.

The NFC card 400 is a card for transmitting the user ID information via the NFC communication 700. The image forming apparatus 100 receives the user ID information from the NFC card 400 via the NFC communication 700, and user authentication is performed based on an authentication database stored in the image forming apparatus 100. Instead of an authentication database, a sever for storing the user ID information may be separately prepared and the image forming apparatus 100 may perform authentication processing in cooperation with the server via the LAN 600.

The wireless LAN access point 500 has a function for enabling communication between the mobile terminal 300 having a wireless LAN interface and a device connected to the LAN 600.

In a wireless communication interface according to the first exemplary embodiment, the system configuration using the wireless LAN communication 800 is used. However, other wireless communication techniques such as Bluetooth (registered trademark) may be used.

The LAN 600 is a network connection achieved by, for example, Ethernet (registered trademark). The image forming apparatus 100, the PC 200, and the wireless LAN access point 500 are interconnected via the LAN 600.

The mobile terminal 300 and the NFC card 400 are examples of recording media having wireless communication functions. The image forming apparatus 100 is an example of an image processing apparatus.

Figure 2:
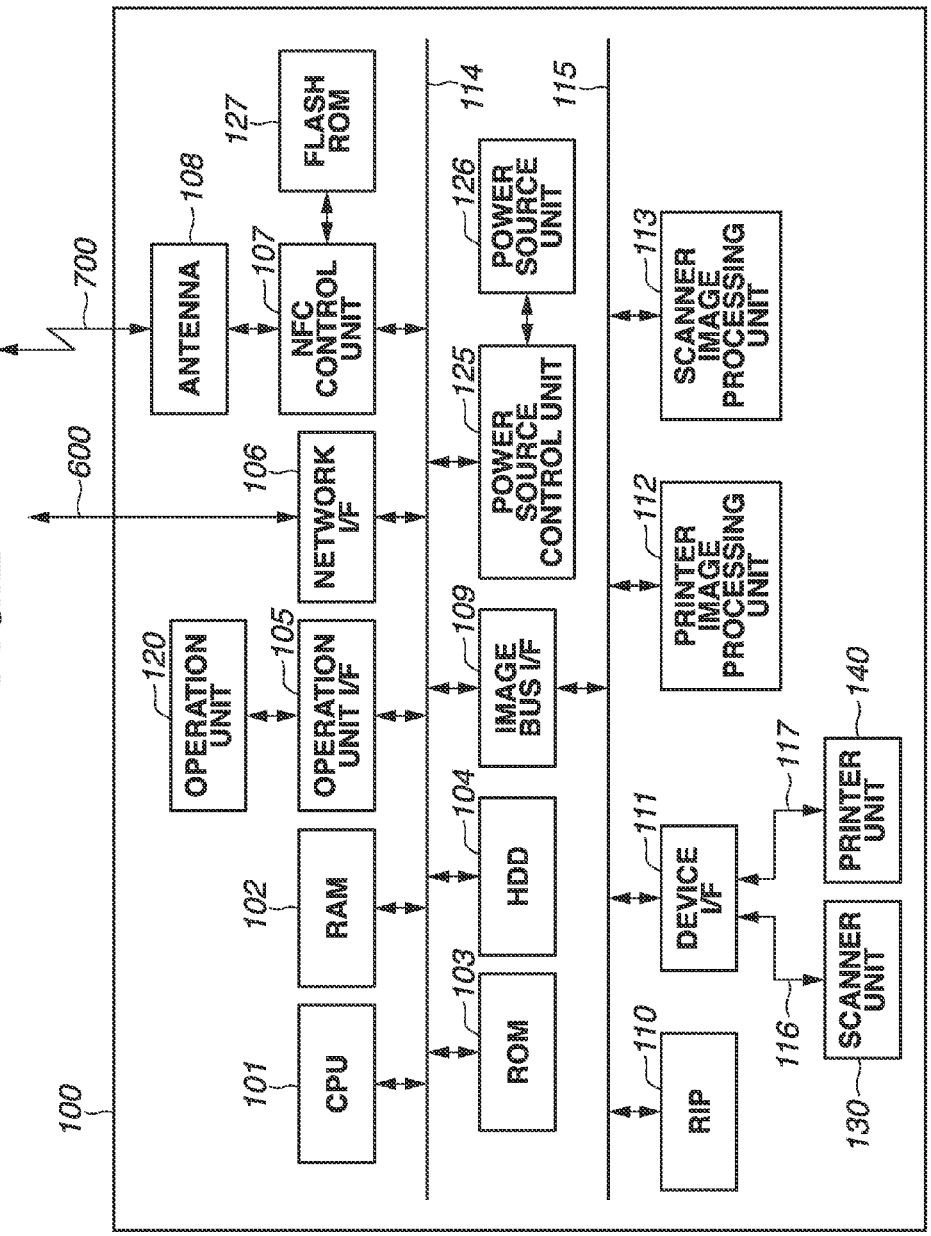
FIG. 2 is a diagram illustrating an example of a hardware configuration of an image forming apparatus.

FIG. 2 is a diagram illustrating an example of a hardware configuration of the image forming apparatus 100.

A central processing unit (CPU) 101 controls the entire image forming apparatus.

A random access memory (RAM) 102 is a memory for storing a program executed by the CPU 101, which is also a work memory for temporarily storing data used for calculation by the CPU 101. A read-only memory (ROM) 103 stores a program used for starting the image forming apparatus 100.

A hard disk drive (HDD) 104 stores a program or various settings for software concerning control of the image forming apparatus 100 or document data to be stored.

An operation unit 120, which allows a user to control the image forming apparatus 100, inputs or outputs information between the image forming apparatus 100 and the user. The operation unit 120 includes a liquid crystal display (LCD), a touch panel, and a hardware key. When the user selects a button displayed on the LCD, the user only needs to touch the displayed button.

The operation unit 120 is an example of a display unit.

An operation interface (I/F) 105, which is an interface for the operation unit 120, relays input or output data to the operation unit 120.

The CPU 101 controls the image forming apparatus 100 based on key information received via the operation I/F 105 and selected by the user and coordinate information on the touch panel.

A network I/F 106 is an interface for exchanging data with an external device via the LAN 600.

A NFC control unit 107 performs controls for exchanging data via the NFC 700.

An antenna 108 is an antenna for transmitting and receiving a radio wave to perform NFC communication 700.

A flash ROM 127, which is connected to the NFC control unit 107, is used for temporarily storing data handled by the NFC control unit 107. The image forming apparatus 100 uses the flash ROM 127 for temporarily storing the data handled by the NFC control unit 107. However, it is not limited to this, and the image forming apparatus 100 can use another nonvolatile memory or a combination of a static RAM (SRAM) with a battery.

A power source control unit 125, which is a unit configured to control a power source of the image forming apparatus 100, controls the power source according to an instruction from the CPU 101 or a user's operation of a power switch.

The CPU 101 stops power supply to an unnecessary part via the power source control unit 125 when it detects a state where no operation has been received from the user for a certain period of time or a state where no print job has been received via the LAN 600 for a certain period of time. The power source control unit 125 can detect a power-OFF operation performed via the power switch, and it can notify the CPU 101 of a detected result as a power-OFF request. The CPU 101 changes a state to a state where power for the image forming apparatus 100 can be turned off by receiving the power-OFF request, and it instructs the power source control unit 125 to stop the power supply.

A power source unit 126, which is a power source for converting alternating-current (AC) power into direct-current (DC) power for the image forming apparatus 100, turns ON or OFF a conversion operation according to an instruction from the power source control unit 125.

The CPU 101, the RAM 102, the ROM 103, the HDD 104, the operation I/F 105, the network I/F 106, the NFC control unit 107, and the power source control unit 125 are interconnected via a system bus 114.

An image bus I/F 109 is for relaying between the system bus 114 and an image bus 115 that connects units responsible for image processing, and converting a data structure.

A raster image processor (RIP) 110, a device I/F 111, a printer image processing unit 112, and a scanner image processing unit 113 are connected to the image bus 115.

The RIP 110 converts a page description language (PDL) code or a display list into a bitmap image.

The device I/F 111, which is an interface for connecting a scanner unit 130 and a printer unit 140 to the image bus 115, is connected to the scanner unit 130 via a scanner bus 116 and to the printer unit 140 via a scanner bus 117.

The device I/F 111 adjusts timing for transmitting image data received from the scanner unit 130 via the scanner bus 116 to the image bus 115. Further, the device I/F 111 adjusts timing for transmitting the image data from the image bus 115 to the printer unit 140 via the printer bus 117.

The scanner unit 130 reads a document to generate image data.

The printer unit 140 performs processing such as correction or resolution conversion for the image data to be printed and output, according to a print engine of the image forming apparatus 100.

Figure 3:
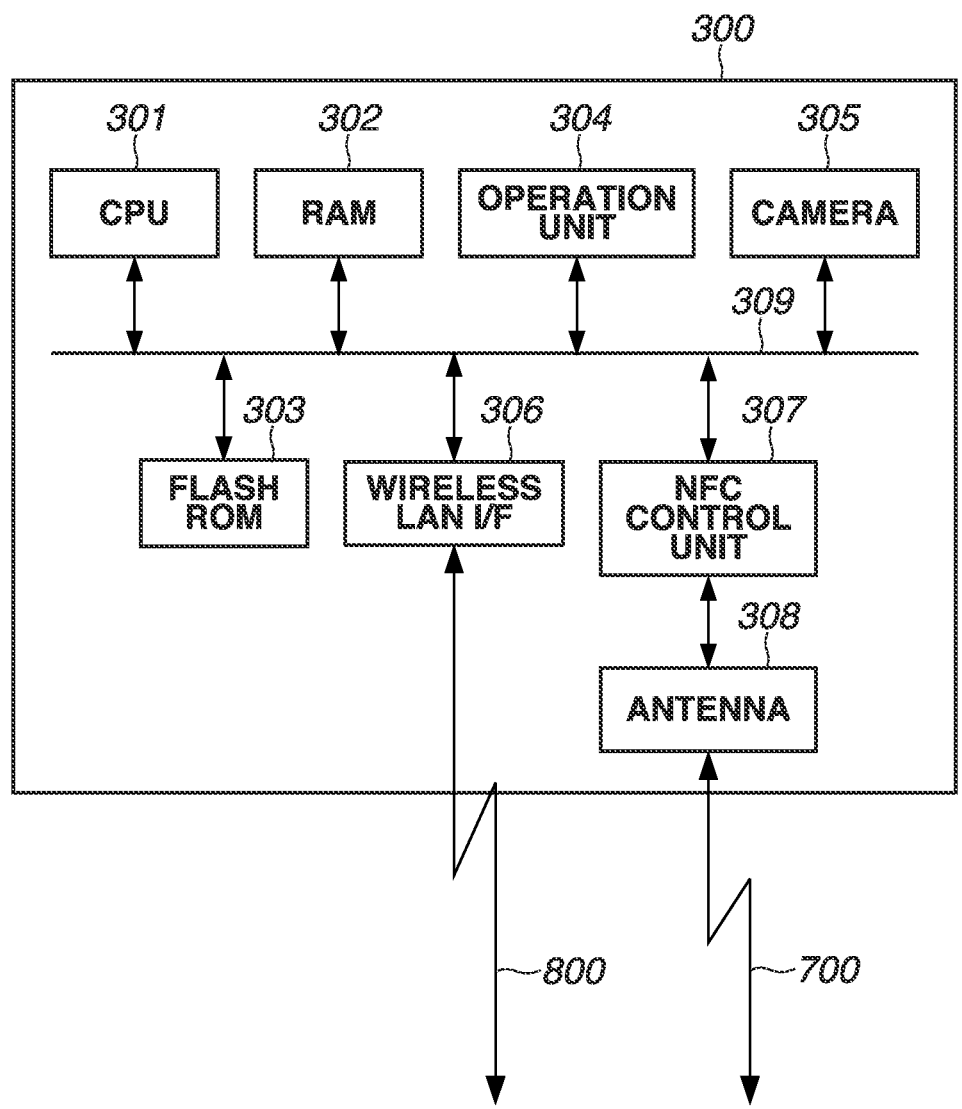
FIG. 3 is a diagram illustrating an example of a hardware configuration of a mobile terminal.

FIG. 3 is a diagram illustrating an example of a hardware configuration of the mobile terminal 300.

A CPU 301 controls the entire mobile terminal 300.

A RAM 302 is a memory for storing a program executed by the CPU 301, which is also a work memory for temporarily storing data to be used for calculation by the CPU 301.

A flash ROM 303 stores the program or various data to be used by the CPU 301.

An operation unit 304, which inputs or outputs information between the user and the mobile terminal 300, includes an LCD and a touch panel.

A camera 305 captures a still image or a moving image.

A wireless LAN I/F 306 is an interface for exchanging data with an external device via the wireless LAN communication 800.

An NFC control unit 307 performs control to execute the NFC communication 700.

An antenna 308 is an antenna for transmitting and receiving a radio wave to perform the NFC communication 700.

The CPU 301, the RAM 302, the flash ROM 303, the operation unit 304, the camera 305, the wireless LAN I/F 306, and the NFC control unit 307 are interconnected via a system bus 309 to exchange data with one another.

Figure 4:
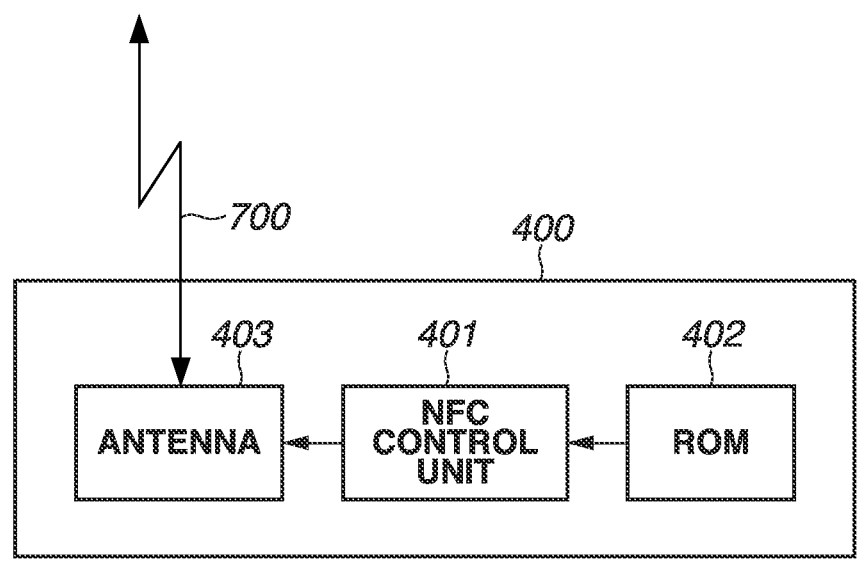
FIG. 4 is a diagram illustrating an example of a hardware configuration of an NFC card.

FIG. 4 is a diagram illustrating an example of a hardware configuration of the NFC card 400.

A ROM 402 stores user ID information held by the NFC card 400. In the NFC card 400, the user ID information is stored in the ROM 402. However, it is not limited to this, and a nonvolatile memory such as a flash ROM can be used. An NFC control unit 401 performs control to execute the NFC communication 700. An antenna 403 is an antenna for transmitting and receiving a radio wave to perform the NFC communication 700.

Figure 5:
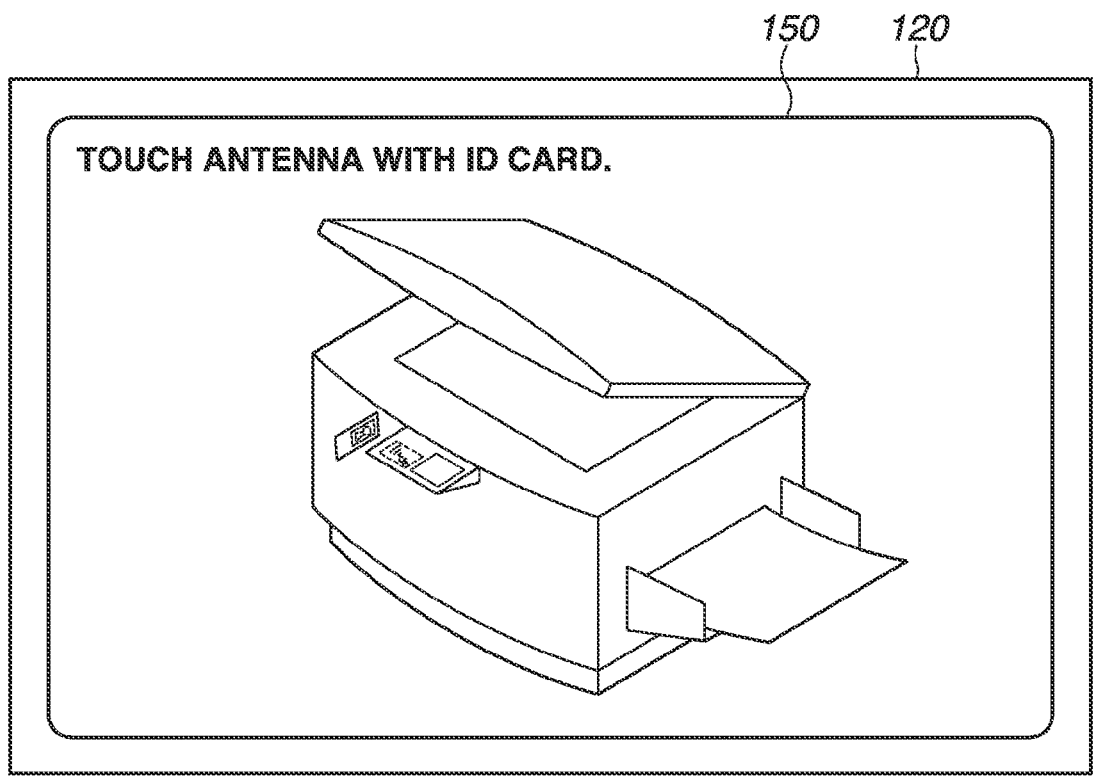
FIG. 5 is a diagram illustrating an example of a user authentication screen displayed on an operation unit of the image forming apparatus.

FIG. 5 is a diagram illustrating an example of a user authentication screen 150 displayed on the operation unit 120 of the image forming apparatus 100.

The user authentication screen illustrated in FIG. 5 is controlled by the CPU 101 based on a software program stored in the RAM 102 or the HDD 104. Screens described below are similarly controlled.

The user authentication screen 150 is displayed on the operation unit 120 of the image forming apparatus 100. The NFC card 400 is brought into touch with the antenna 108 according to a message displayed on the operation unit 120. The image forming apparatus 100 performs user authentication based on user ID information received via the NFC communication 700.

Figure 6:
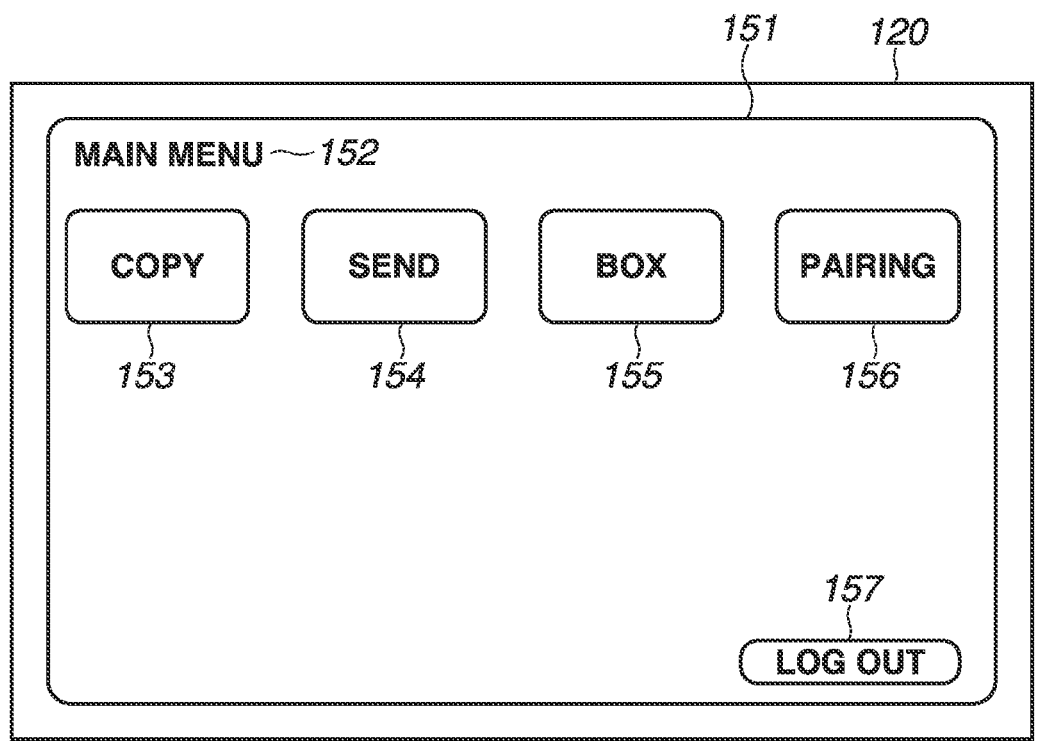
FIG. 6 is a diagram illustrating an example of a main menu screen displayed on the operation unit of the image forming apparatus.

FIG. 6 is a diagram illustrating an example of a main menu screen displayed on the operation unit 120 of the image forming apparatus 100.

When the user ID authentication processing normally ends, the screen is changed from a state of the user authentication screen 150 illustrated in FIG. 5 to the main menu screen 151.

A title 152 of the menu screen is displayed as a main menu.

A copy button 153 is selected when the user executes a copy function. A send button 154 is selected when the user executes a send function. A box button 155 is selected when the user executes a box function. A pairing button 156 is selected when the user executes a pairing function.

The pairing function is for interconnecting the image forming apparatus 100 and the mobile terminal 300 via the LAN 600 and the wireless LAN communication 800.

By the pairing function, the IP address of the image forming apparatus 100 is transmitted to the mobile terminal 300 via the NFC communication 700, and then the mobile terminal 300 sets the received IP address as a transmission destination IP address of wireless LAN communication. However, the pairing function is not limited to this. Setting can be executed for interconnecting the image forming apparatus 100 and the mobile terminal 300 by using other wireless communication techniques such as Bluetooth (registered trademark).

A "log out" button 157 is selected when the user logs out from the authentication state after ending the use of the image forming apparatus 100. The image forming apparatus 100 in the state of the main menu screen configuration is changed to the state of the user authentication screen configuration illustrated in FIG. 5 when the user selects the "log out" button 157.

Figure 7:
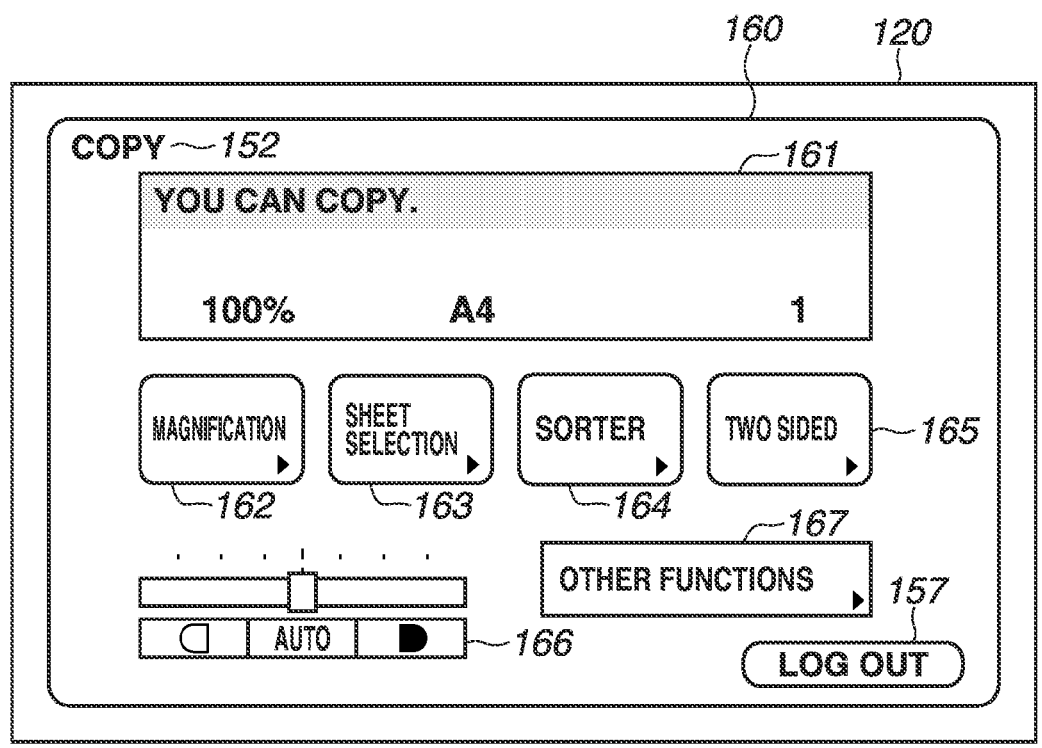
FIG. 7 is a diagram illustrating an example of a copy menu screen displayed on the operation unit of the image forming apparatus.

FIG. 7 is a diagram illustrating an example of a copy menu screen 160 displayed on the operation unit 120 of the image forming apparatus 100.

When the user selects the copy button 153 from the state of the main menu screen 151 illustrated in FIG. 6, the screen is changed to a copy menu screen 160.

A title 152 of the menu screen is displayed as copy. In a copy state display window 161, a copy magnification that is current copy function setting is equal (i.e., 100%), a sheet size is A4, and the number of copies is 1. The user can change the copy magnification using magnification button 162 to one of predetermined magnifications of 25, 50, 100, 200, and 400 [%]. A sheet selection button 163 is selected when the user changes a sheet size such as A4 or A3 set in a paper feed cassette deck of the image forming apparatus 100. A sorter button 164 is selected when the user changes an output form of a printed paper document. By using the sorter button 164, the user can change presence of sort processing or staple processing by page unit or group unit. By selecting a "two-sided" button 165, the user can instruct copying of one-side printed paper by two-sided printing, or copying of two-side printed paper by two-sided printing. By selecting a printing density adjustment bar 166, the user can change a density when copying. By selecting "other functions" button 167, the user can instruct a function of 2 in 1 printing for printing two pages in one page, bookbinding printing, copying with a different document size, single color printing, image quality adjustment, or area designated printing. When the user selects the "log out" button 157, the image forming apparatus 100 in the state of the copy menu screen configuration is changed to the state of the user authentication screen configuration illustrated in FIG. 5.

Figure 8:
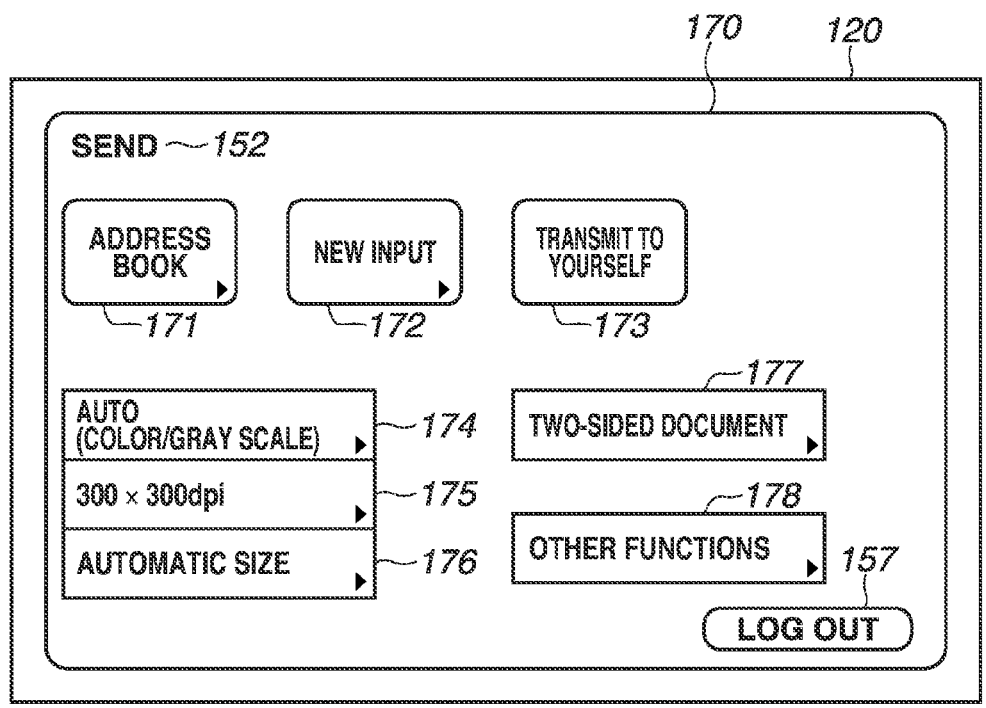
FIG. 8 is a diagram illustrating an example of a send menu screen displayed on the operation unit of the image forming apparatus.

FIG. 8 is a diagram illustrating an example of a send menu screen 170 displayed on the operation unit 120 of the image forming apparatus 100.

When the user selects a send button 154 from the state of the main menu screen 151 illustrated in FIG. 6, the screen is changed to a send menu screen 170. The send menu screen 170 is used as a setting screen by the user for setting a send function of an address or the like.

A title 152 of the menu screen is displayed as send. An "address book" button 171 is selected when the user designates, among addresses registered beforehand in the image forming apparatus 100, an address to which computerized document data is transmitted. A "new input" button 172 is selected when the user directly inputs the address to which the computerized document data is transmitted. A transmit to yourself button 173 is selected when the user transmits the computerized document data to himself. A color mode button 174 is used when the user sets a color mode for creating document data from paper document by using the image forming apparatus 100. The user can select, by using the color mode button 174, color setting or monochrome setting in addition to an automatic mode allowing the image forming apparatus 100 to make automatic determination. A resolution button 175 is for designating resolution when the user creates document data by using the image forming apparatus 100. A sheet size button 176 is used by the user for setting a sheet size of a paper document. The user can select, by using the sheet size button 176, A4 or A3 in addition to an automatic size mode allowing the image forming apparatus 100 to make automatic determination. By selecting a "two-sided document" button 177, the user can set whether the paper document is a one-sided document or a two-sided document. By selecting an "other functions" button 178, the user can instruct a function of image quality adjustment, density adjustment, or 2 in 1 layout. When the user selects the "log out" button 157, the image forming apparatus 100 in the state of the send menu screen configuration is changed to the state of the user authentication screen configuration illustrated in FIG. 5.

Figure 9:
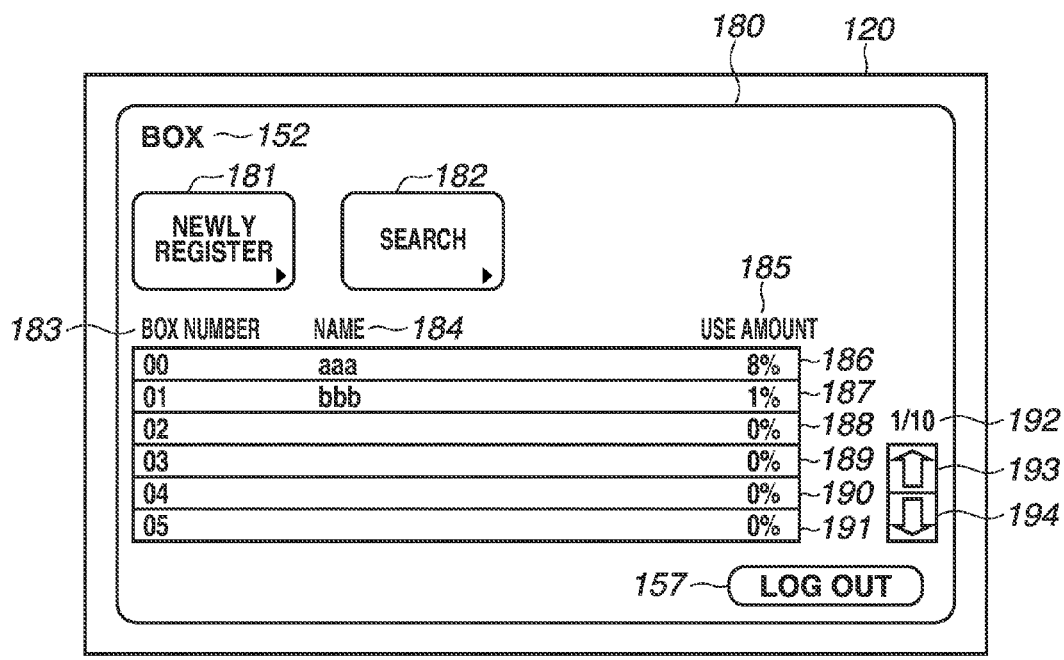
FIG. 9 is a diagram illustrating an example of a box menu screen displayed on the operation unit of the image forming apparatus.

FIG. 9 is a diagram illustrating an example of a box menu screen 180 displayed on the operation unit 120 of the image forming apparatus 100.

When the user selects a box button 155 from the state of the main menu screen 151 illustrated in FIG. 6, the screen is changed to a box menu screen 180. The box menu screen 180 is used as a screen by the user for using a box function.

A title 152 of the menu screen is displayed as box. By selecting a "newly register" button 181, the user can register association of a box prepared beforehand with a name, an access right, or user ID information for an individual use. By selecting a "search" button 182, the user can perform searching based on a box name or a name of document data stored in the box. A box number 183 indicates a management number of a box prepared in the image forming apparatus 100, and, for example, 01, 02, . . . , are added in order from No. 00. A box name 184 indicates a box name registered by the user.

A box use amount 185 indicates a capacity used by a box. A box number 00 button 186 indicates a name registered in the box number 00 and a box use amount. By selecting the button 186, the user can display a list of document data stored in the box number 00. Buttons from a box number 01 button 187 to a box number 05 button 191 are buttons having functions similar to that of the box number 00 button 186 corresponding to each box number. In the image forming apparatus 100, a collection of a certain number of buttons corresponding to the respective boxes is managed as a page.

In a box menu screen configuration illustrated in FIG. 9, the box numbers 00 to 05 are managed as one page. A page number 192 indicates a current number of pages displayed on the box menu screen 180 and a total number of pages. In the box menu screen configuration illustrated in FIG. 9, a first page of a total of ten pages is displayed. By selecting a previous page selection button 193, the user can display a previous page of the page displayed on the box menu screen configuration 180. By selecting a next page selection button 194, the user can display a next page of the page displayed on the box menu screen configuration 180. When the user selects the "log out" button 157, the image forming apparatus 100 in the state of the box menu screen configuration is changed to the state of the user authentication screen configuration illustrated in FIG. 5.

Figure 10:
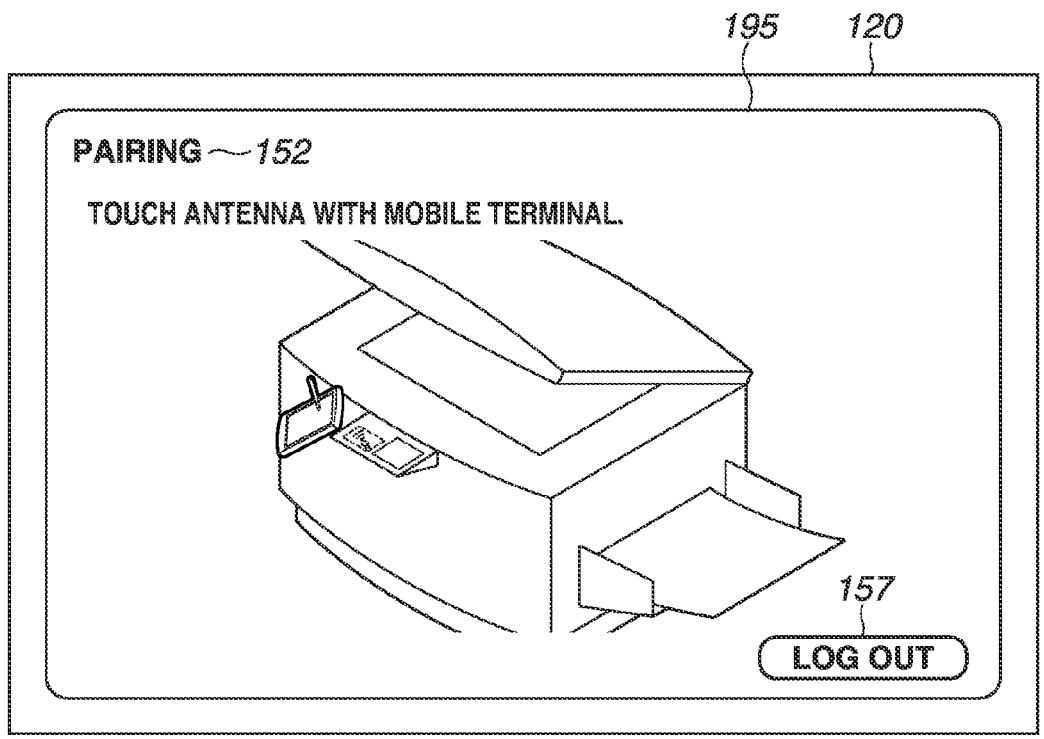
FIG. 10 is a diagram illustrating an example of a pairing menu screen displayed on the operation unit of the image forming apparatus.

FIG. 10 is a diagram illustrating an example of a pairing menu screen 195 displayed on the operation unit 120 of the image forming apparatus 100.

When the user selects the pairing button 156 from the state of the main menu screen 151 illustrated in FIG. 6, the screen is changed to a pairing menu screen 195.

A title 152 of the menu screen is displayed as pairing. In the first exemplary embodiment, when pairing is performed between the image forming apparatus 100 and the mobile terminal 300, the user performs an operation according to a display on the pairing menu screen 195. When the user selects the "log out" button 157, the image forming apparatus 100 in the state of the pairing menu screen configuration is changed to the state of the user authentication screen configuration illustrated in FIG. 5.

Figure 11:
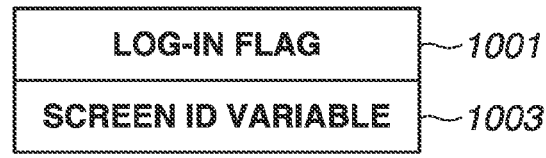
FIG. 11 is a diagram illustrating an example of a local variable.

FIG. 11 is a diagram illustrating an example of a local variable.

The local variable illustrated in FIG. 11 is stored in a work area in the RAM 102, and accessed by the CPU 101 based on a software program stored in the RAM 102 or the HDD 104.

A log-in flag 1001 is a flag for storing a current log-in state of the image forming apparatus 100. The CPU 101 stores "1" in the log-in flag 1001 in a state where the user has logged in, and "0" in the log-in flag 1001 in a state where the user has logged out.

An address 1000 is an address of the log-in flag 1001 in the RAM 102, and an address value is 0xAAAA_B000.

A screen ID variable 1003 is a variable for storing ID information of a screen configuration currently displayed on the operation unit 120 of the image forming apparatus 100.

In the first exemplary embodiment, IDs are added to all the screen configurations. 0x0 is added to the ID of the user authentication screen configuration illustrated in FIG. 5. 0x1 is added to the ID of the main menu screen configuration illustrated in FIG. 6. 0x2 is added to the ID of the copy menu screen configuration illustrated in FIG. 7. 0x3 is added to the ID of the send menu screen configuration illustrated in FIG. 8. 0x4 is added to the ID of the box menu screen configuration illustrated in FIG. 9. 0x5 is added to the ID of the pairing menu screen configuration illustrated in FIG. 10. The CPU 101 stores 0x3 in the screen ID variable 1003 when a currently displayed screen configuration is the send menu screen configuration, and updates the screen ID variable 1003 each time the screen configuration is changed.

The screen ID variable is an example of state information of an image processing apparatus.

An address 1002 is an address of the screen ID variable 1003 in the RAM 102, and an address value is 0xAAAA_B004. In the first exemplary embodiment, the local variable is configured with 32 bits, which is in no way limitative. An address value allocated to the local variable, a flag value allocated to each state, and ID, which are optimal for the system, can be similarly set.

Figure 12:
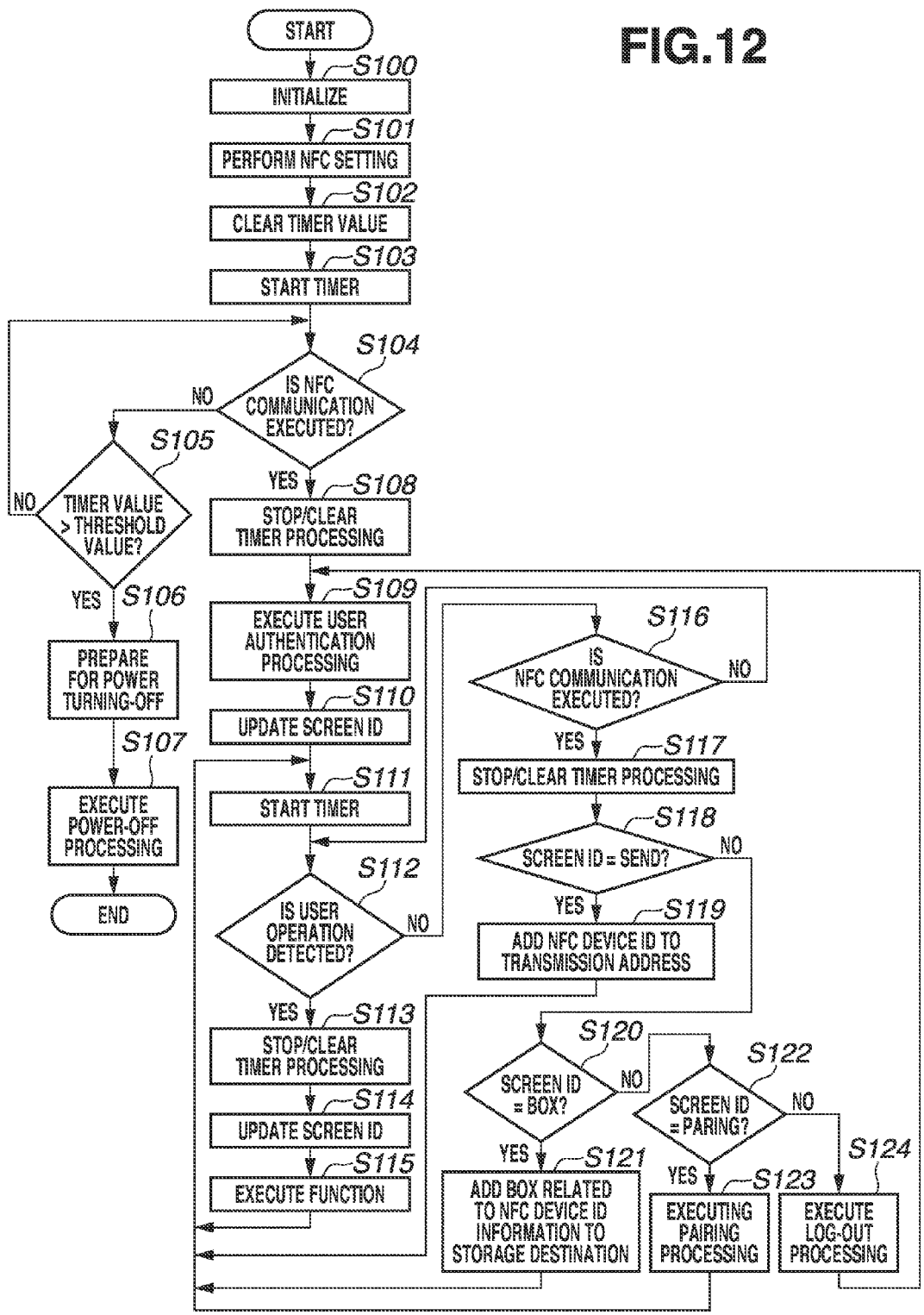
FIG. 12 is a flowchart illustrating an example of information processing by an image forming apparatus according to a first exemplary embodiment.

FIG. 12 is a flowchart illustrating an example of information processing of the image forming apparatus 100 according to the first exemplary embodiment.

After power-ON of the image forming apparatus 100, the program stored in the ROM 103 is executed by the CPU 101. The CPU 101 executes processing based on the software program stored in the HDD 104 loaded in the RAM 102, and accordingly processing of the flowchart described below is realized. Processes of other flowcharts described below are similarly achieved.

In step S100, the CPU 101 initializes each module in the image forming apparatus 100. Specifically, the CPU 101 releases hardware resetting of each module to execute setting of various threshold values, securing of the local variable illustrated in FIG. 11 in the RAM 102, or initialization.

In step S101, the CPU 101 executes setting for the NFC control unit 107 to start the NFC communication 700. In the first exemplary embodiment, in the setting for the NFC communication 700, the CPU 101 achieves the NFC communication 700 with the mobile terminal 300 by setting an NFC operation mode to P2P (peer-to-peer) and an initiator. Further, the CPU 101 achieves the NFC communication 700 with the NFC card 400 such as a Mifare (registered trademark) card or a FeliCa (registered trademark) card by setting the NFC operation mode to a reader/writer or the initiator. The CPU 101 achieves the NFC communication 700 with the mobile terminal 300 and the NFC card 400 by switching these two operation modes for each predetermined period of time.

In step S102, the CPU 101 clears a timer value for timeout detection.

In step S103, the CPU 101 starts counting of a timeout detection timer. In the first exemplary embodiment, timer processing is counting-up. However, the processing is not limited to the counting-up.

The CPU 101 instructs the NFC control unit 107 to transmit data referred to as a polling request. The NFC control unit 107 transmits the polling request via the antenna 108. When the mobile terminal 300 or the NFC card 400 is present in a space within a radio wave accessible range via the NFC communication 700, the NFC control unit 107 receives data so-called a response via the antenna 108. In step S104, the NFC control unit 107 according to the first exemplary embodiment tries reception of user ID information from the NFC card 400 based on the protocol defined as the NFC communication 700. The CPU 101 can check a state of the NFC communication 700 from the NFC control unit 107.

When reception of the user ID information from the NFC card 400 fails (NO in step S104), in step S105, the CPU 101 compares the timer value with a preset threshold value.

When the timer value exceeds the threshold value (YES in step S105), in step S106, the CPU 101 determines that the image forming apparatus 100 has not been operated for a certain period of time, and prepares for turning OFF power to reduce power consumption of the image forming apparatus 100. Specifically, a part of the data stored in the RAM 102 is moved to the HDD 104 based in an instruction from the CPU 101.

The CPU 101 instructs the power source control unit 125 to turn OFF power for the image forming apparatus 100. In step S107, the power source control unit 125 turns OFF AC/DC conversion of the power source unit 126.

On the other hand, when the timer value does not exceed the threshold value (NO in step S105), in step S104, the CPU 101 continues instructing the NFC control unit 107 to execute the NFC communication 700.

When it is determined that the NFC control unit 107 has received the user ID information (YES in step S104), in step S108, the CPU 101 stops the timer counting processing to clear the timer value.

In step S109, the CPU 101 executes authentication processing based on an authentication database having the received user ID information stored in the image forming apparatus 100. The CPU 101 performs control to display the main menu screen configuration illustrated in FIG. 6 on the operation unit 120 when the user authentication processing normally ends.

The CPU 101 stores "1" in the log-in flag 1001. In step S110, the CPU 101 stores 0x1 indicating the ID of the main menu screen configuration in the screen ID variable.

In step S111, the CPU 101 starts timer counting.

In step S112, the CPU 101 detects a user's operation performed via the touch panel or the hardware key. When a user's operation has been detected (YES in step S112), in step S113, the CPU 101 stops the timer counting processing to clear the timer value.

In step S114, the CPU 101 stores the ID of the screen configuration based on the user's operation in the screen ID variable.

In step S115, the CPU 101 executes a function of the image forming apparatus based on the user's operation.

On the other hand, when no user's operation has been detected (NO in step S112), in step S116, the CPU 101 instructs the NFC control unit 107 to execute the NFC communication 700. When an opposing device is the mobile terminal 300, ID information of the mobile terminal 300 is acquired. When the opposing device is the NFC card 400, user ID information is acquired. In the processing of the image forming apparatus 100, the ID information of the mobile terminal 300 and the user ID information of the NFC card 400 are collectively referred to as NFC device ID information.

When it is determined that no NFC device ID information has been received (NO in step S116), in step S112, the CPU 101 detects a user's operation performed via the touch panel or the hardware key again.

On the other hand, when it is determined that NFC device ID information has been received (YES in step S116), in step S117, the CPU 101 stops the timer counting processing to clear the timer value.

In step S118, the CPU 101 refers to the value stored in the screen ID variable to compare the ID with the ID of the send menu screen configuration.

When it is determined that the ID stored in the screen ID variable coincides with the ID of the send menu screen configuration (YES in step S118), in step S119, the CPU 101 adds the received NFC device ID information to a transmission destination address (destination) used in the send function. In step S119, the CPU 101 of the image forming apparatus 101 adds, for example, a mail address corresponding to the user ID to the transmission destination address. Then, the image forming apparatus 100 executes the send function for an address registered in the transmission destination address. In step S111, the CPU 101 starts timer counting.

On the other hand, when it is determined that the ID stored in the screen ID variable does not coincide with the ID of the send menu screen configuration (NO in step S118), in step S120, the CPU 101 compares the ID stored in the screen ID variable with the ID of the box menu screen configuration.

When it is determined that the ID stored in the screen ID variable coincides with the ID of the box menu screen configuration (YES in step S120), in step S121, the CPU 101 adds a box related to the received NFC device ID information to a storage destination box. In the first exemplary embodiment, the image forming apparatus 100 stores computerized document data in a box registered in the storage destination box. Then, in step S111, the CPU 101 starts timer counting.

On the other hand, when it is determined that the ID stored in the screen ID variable does not coincide with the ID of the box menu screen configuration (NO in step S120), in step S122, the CPU 101 compares the ID stored in the screen ID variable with the ID of the pairing menu screen configuration.

When it is determined that the ID stored in the screen ID variable coincides with the ID of the pairing menu screen configuration (YES in step S122), in step S123, the CPU 101 transmits an IP address set in the image forming apparatus 100 to the mobile terminal 300. Then, in step S111, the CPU 101 starts timer counting.

On the other hand, when it is determined that the ID stored in the screen ID variable does not coincide with the ID of the pairing menu screen configuration (NO in step S122), in step S124, the CPU 101 executes log-out processing. More specifically, the CPU 101 discards data about settings based on the user who is currently using the image forming apparatus 100, stores "0" in the log-in flag 1001, and then performs control to execute user authentication processing. Then, in step S109, the CPU 101 executes authentication processing based on the authentication database having the newly received NFC device ID information stored in the image forming apparatus 100.

In the first exemplary embodiment, in the processing of the flowchart of the image forming apparatus 100, the NFC communication 700 is used. However, it is not limited to this, and a near field wireless communication means such as Radio Frequency IDentification (RFID) can be used. That is similar to the exemplary embodiments described below.

Thus, according to the present exemplary embodiment, the CPU 101 stores the state of the device (e.g., user interface (UI) menu screen configuration), and changes the handling of the received information according to the state of the device at the execution timing of the NFC communication. As a result, an intuitive operation can be achieved.

An image forming apparatus 100 according to a second exemplary embodiment is different from the image forming apparatus 100 according to the first exemplary embodiment in processing when the NFC card 400 and the NFC communication 700 are executed.

Figure 13B:
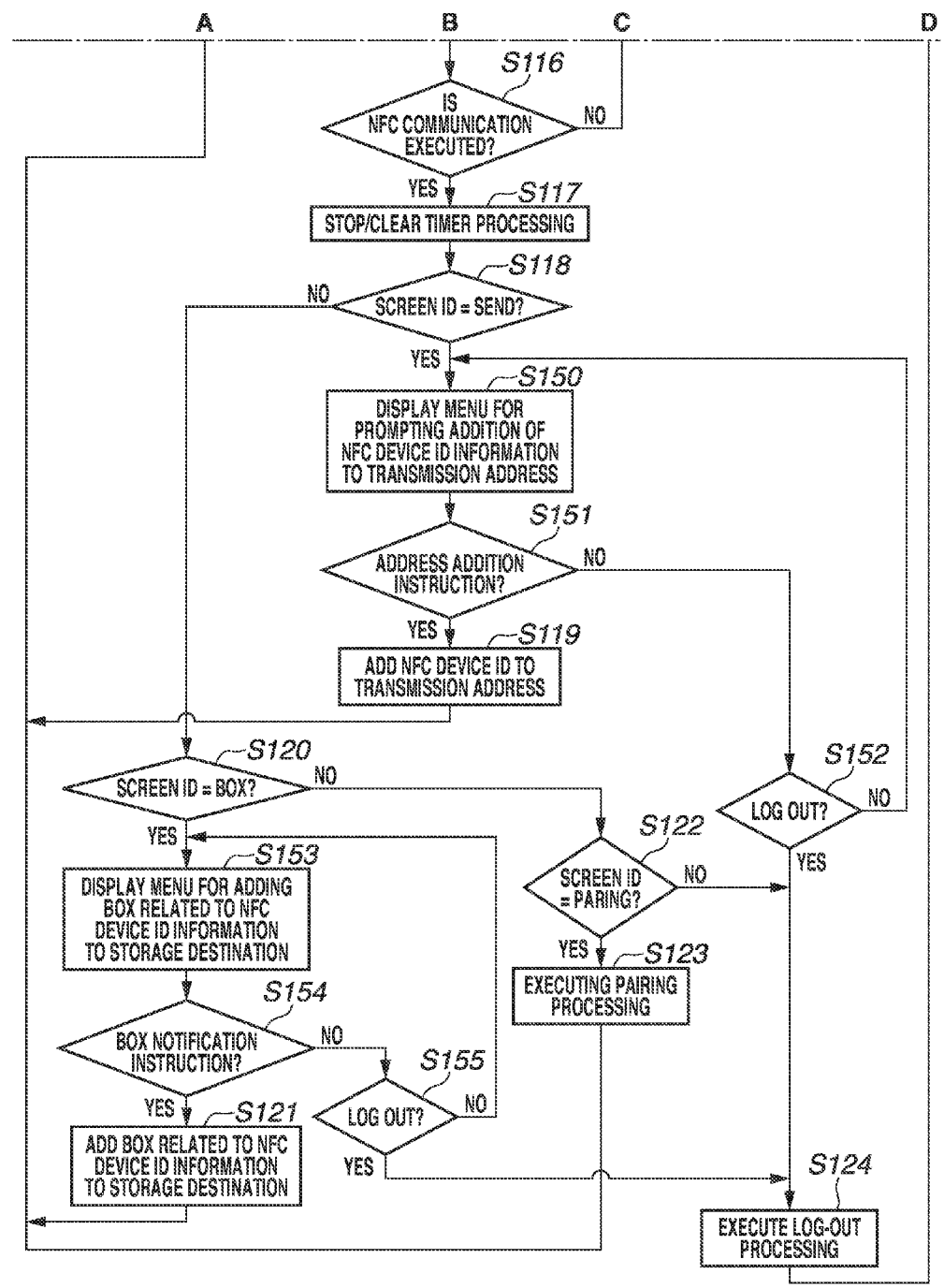
FIG. 13 (FIG. 13A+13B) is a flowchart illustrating an example of information processing by an image forming apparatus according to a second exemplary embodiment.

FIG. 13 is a flowchart illustrating an example of information processing of the image forming apparatus 100 according to the second exemplary embodiment. Descriptions of the information processing portions thereof similar to those of the image forming apparatus 100 according to the first exemplary embodiment illustrated in FIG. 12 (including steps S100 to S115 of FIG. 13A) will be omitted.

When it is determined that NFC device ID information has been received (YES in step S116), in step S117, a CPU 101 stops timer counting processing to clear a timer value.

In step S118, the CPU 101 refers to a value stored in a screen ID variable to compare its ID with ID of a send menu screen configuration.

When it is determined that the ID stored in the screen ID variable coincides with the ID of the send menu screen configuration (YES in step S118), the CPU 101 performs the following processing. Specifically, in step S150, the CPU 101 displays a menu for adding the received NFC device ID information to a transmission address used in a send function.

In steps S151 and S152, the CPU 101 detects a user's operation performed via a touch panel.

When it is determined that no user's operation performed via the touch panel has been detected (NO in step S151, and NO in step S152), the CPU 101 performs the following processing. Specifically, in step S150, the CPU 101 displays a menu for adding the NFC device ID information to the transmission address used in the send function.

When a user selects logging-out (YES in step S152), in step S124, the CPU 101 executes log-out processing.

On the other hand, when the user selects addition of the transmission destination address (YES in step S151), in step S119, the CPU 101 adds the received NFC device ID information to the transmission destination address used in the send function.

On the other hand, when it is determined that the ID stored in the screen ID variable does not coincide with the ID of the send menu screen configuration (NO in step S118), in step S120, the CPU 101 compares the ID stored in the screen ID variable with ID of a box menu screen configuration.

When it is determined that the ID stored in the screen ID variable coincides with the ID of the box menu screen configuration (YES in step S120), the CPU 101 performs the following processing. Specifically, in step S153, the CPU 101 displays a menu for adding a box related to the received NFC device ID information to a box storage destination box.

In steps S154 and S155, the CPU 101 detects a user's operation performed via the touch panel.

When it is determined that no user's operation performed via the touch panel has been detected (NO in step S154, and NO in step S155), the CPU 101 performs the following processing. Specifically, in step S153, the CPU 101 displays the menu for adding the box related to the received NFC device ID information to the box storage destination box.

When the user selects logging-out (YES in step S155), in step S124, the CPU 101 executes log-out processing.

On the other hand, when the user selects addition of the storage destination box (YES in step S154), in step S121, the CPU 101 adds the box related to the received NFC device ID information to the storage destination box. In the second exemplary embodiment, the image forming apparatus 100 stores computerized document data in a box registered in the storage destination box.

Figure 14:
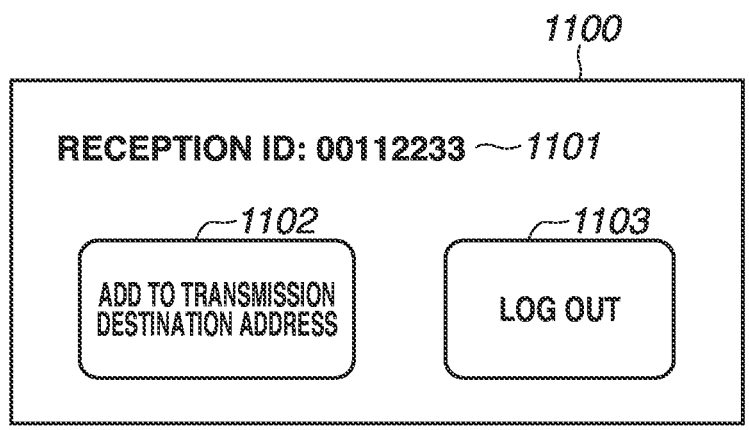
FIG. 14 is a diagram illustrating an example of a menu screen for adding NFC device ID information to a transmission destination address used in a send function.

FIG. 14 is a diagram illustrating an example of a menu screen 1100 for adding the NFC device ID information displayed on an operation unit 120 of the image forming apparatus 100 according to the second exemplary embodiment to the transmission destination address used in the send function.

In a reception ID 1101, the NFC device ID information received via the NFC communication 700 is displayed. An "add to transmission destination address" button 1102 is for instructing addition of the received NFC device ID information as a transmission destination address used in the send function. A "log out" button 1103 is for instructing execution of log-out processing.

Figure 15:
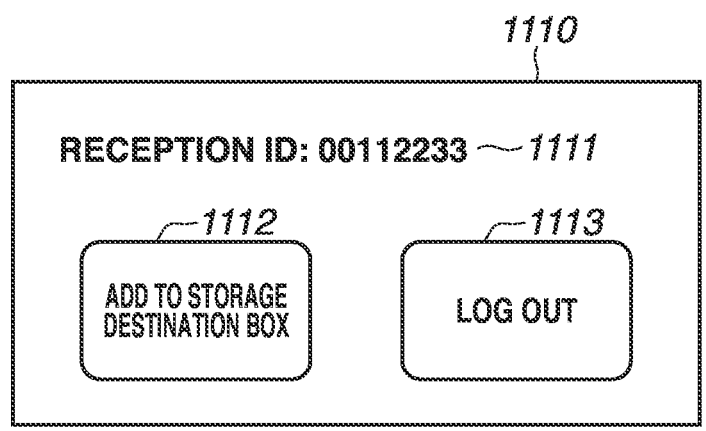
FIG. 15 is a diagram illustrating an example of a menu screen for adding a box related to the NFC device ID information to a storage destination box.

FIG. 15 is a diagram illustrating an example of a menu screen 1110 for adding a box related to the NFC device ID information displayed on the operation unit 120 of the image forming apparatus 100 according to the second exemplary embodiment to a storage destination box.

In a reception ID 1111, the NFC device ID information received via the NFC communication 700 is displayed. An "add to storage destination box" button 1112 for instructing addition of the received NFC device ID information as a storage destination box. A "log out" button 1113 is for instructing execution of log-out processing.

Thus, according to the present exemplary embodiment, the CPU 101 stores the state of the device (e.g., UI menu screen configuration), and displays the screen for changing handling of the received information according to the state of the device at the execution timing of the NFC communication to execute checking. Then, the CPU 101 changes the handling of the received information based on choice information selected by the user via the screen. As a result, an operation intuitive for the user can be achieved while checking.

An image forming apparatus 100 according to a third exemplary embodiment is different from the image forming apparatuses 100 according to the first and second exemplary embodiments in processing when the NFC card 400 executes the NFC communication 700.

Figure 16B:
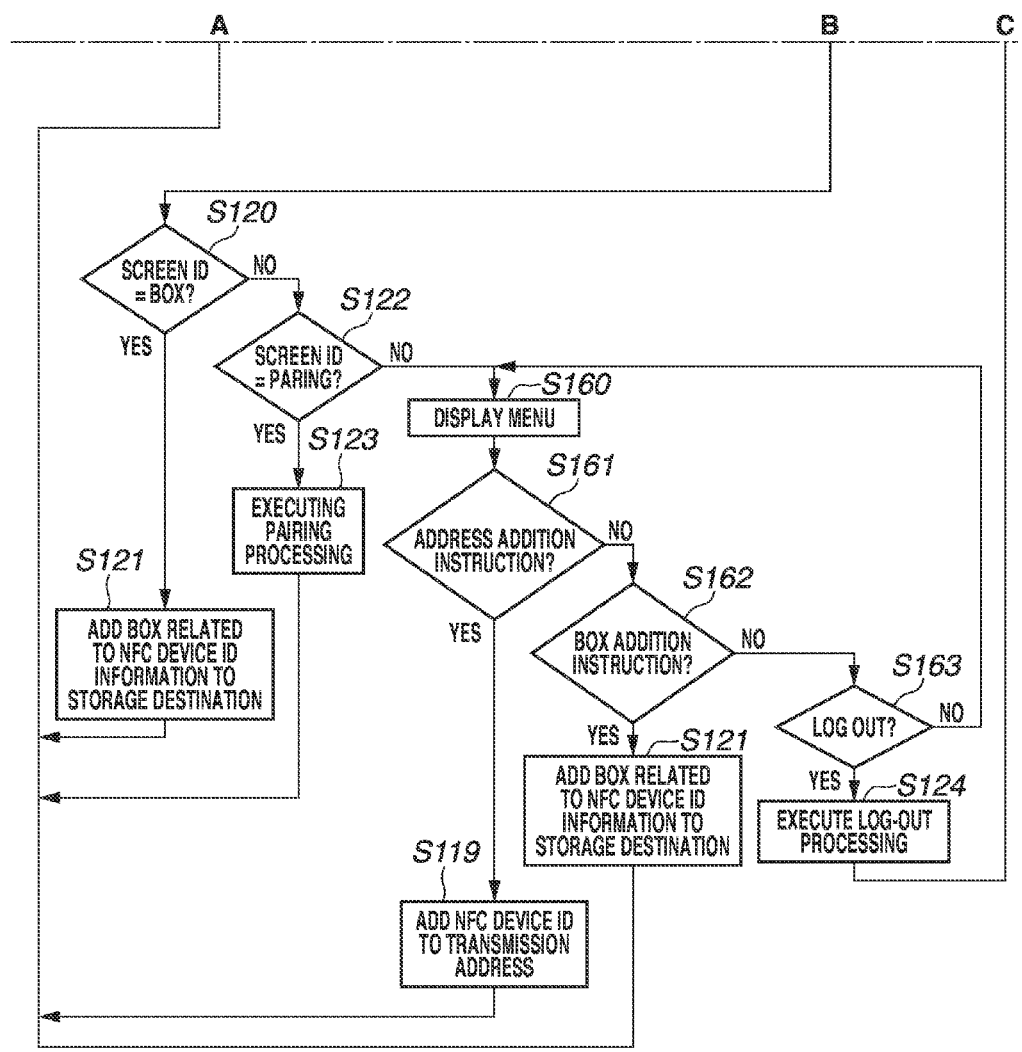
FIG. 16 (16A+16B) is a flowchart illustrating an example of information processing of an image forming apparatus according to a third exemplary embodiment.

FIG. 16 is a flowchart illustrating an example of information processing of the image forming apparatus 100 according to the third exemplary embodiment. Descriptions of information processing portions similar to those of the image forming apparatus 100 according to the first exemplary embodiment illustrated in FIG. 12 (including steps S100 to S119 on FIG. 16A) will be omitted.

When it is determined that NFC device ID information has been received (YES in step S116), in step S117, a CPU 101 stops timer counting processing to clear a timer value.

When it is determined that ID stored in a screen ID variable does not coincide with ID of any of a send menu screen configuration, a box menu screen configuration, and a pairing menu screen configuration (NO in step S118, NO in step S120, and NO in step S122), the CPU 101 performs the following processing. In step S160, the CPU 101 displays a menu for selecting handling of the received NFC device ID information.

In steps S161, S162, and S163, the CPU 101 detects a user's operation performed via a touch panel.

When it is determined that no user's operation performed via the touch panel has been detected (NO in step S161, NO in step S162, and NO in step S163), the CPU 101 performs the following processing. Specifically, in a return to step S160, the CPU 101 displays the menu for selecting the handling of the received NFC device ID information.

When the user selects addition of a transmission destination address (YES in step S161), in step S119, the CPU 101 adds the received NFC device ID information to the transmission destination address used in a send function.

When the user selects addition of a storage destination box (YES in step S162) without selecting addition of the transmission destination address (NO in step S161), the CPU 101 performs the following processing. In step S121, the CPU 101 adds a box related to the received NFC device ID information to a storage destination box. When the user selects logging-out (YES in step S163) without selecting addition of the transmission destination address (NO in step S161) and without selecting addition of the storage destination box (NO in step S162), the CPU 101 performs the following processing. In step S124, the CPU 101 executes log-out processing.

Figure 17:
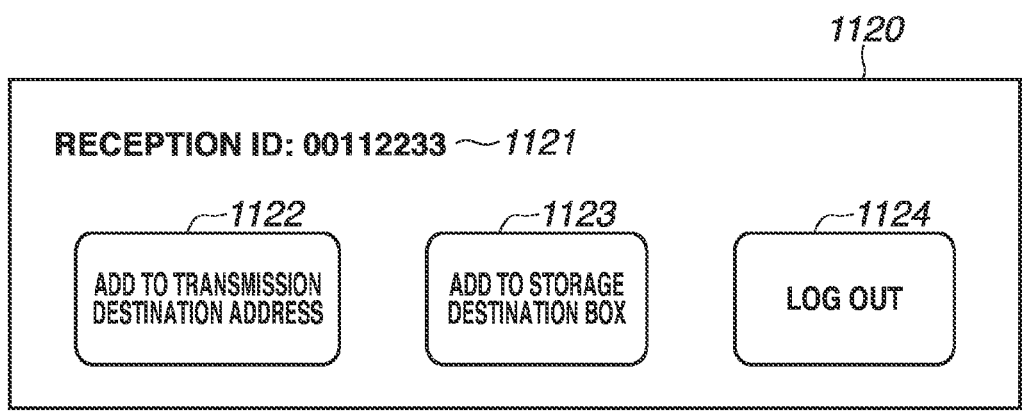
FIG. 17 is a diagram illustrating an example of a menu screen for adding a transmission destination address or a storage destination box based on NFC device ID information.

FIG. 17 is a diagram illustrating an example of a menu screen 1120 for adding a transmission destination address or a storage destination box based on the NFC device ID information displayed on an operation unit 120 of the image forming apparatus 100 according to the third exemplary embodiment.

In a reception ID 1121, the NFC device ID information received via the NFC communication 700 is displayed. An "add to transmission destination address" button 1122 is for instructing addition of the received NFC device ID information as a transmission destination address used in the send function. An "add to storage destination box" button 1123 is for instructing addition of a box related to the received NFC device ID information as a storage destination box. A log out button 1124 is for instructing execution of log-out processing.

Thus, according to the present exemplary embodiment, the CPU 101 stores the state of the device (e.g., UI menu screen configuration), and changes handling of the received information according to the state of the device at the execution timing of the NFC communication. As a result, an intuitive operation can be achieved.

Even in a state where the state of the device at the execution timing of the NFC communication is not set beforehand, the CPU 101 displays the screen for changing the handling of the received information to perform checking under a predetermined condition. Then, the CPU 101 changes the handling of the received information based on choice information about a button or the like selected by the user via the screen.

As a result, an operation intuitive for the user can be achieved.

An image forming apparatus 100 according to a fourth exemplary embodiment is different from the image forming apparatuses 100 of the first to third exemplary embodiments in processing when the NFC card 400 executes the NFC communication 700.

Figure 18:
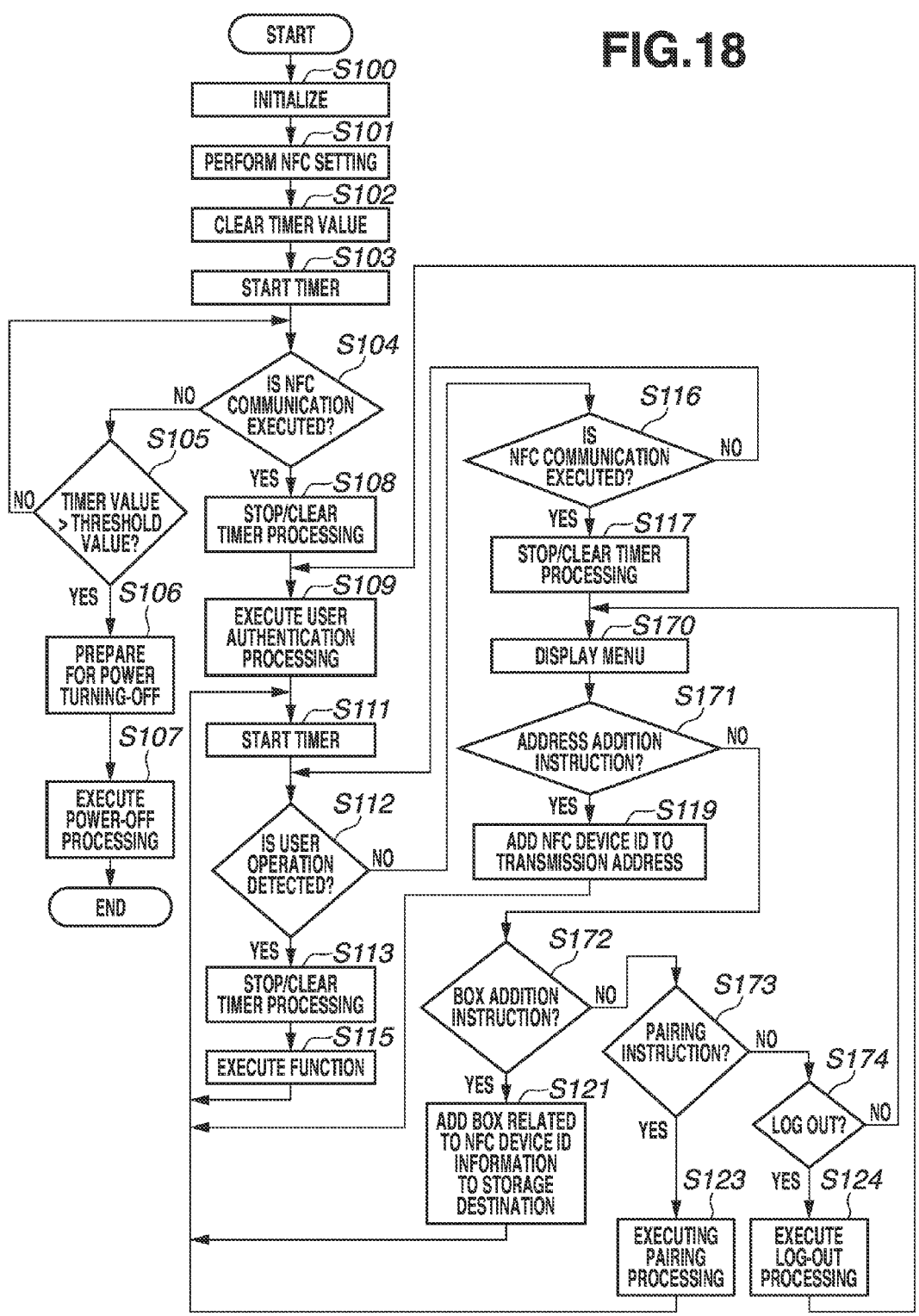
FIG. 18 is a flowchart illustrating an example of information processing of an image forming apparatus according to a fourth exemplary embodiment.

FIG. 18 is a flowchart illustrating an example of information processing of the image forming apparatus 100 according to the fourth exemplary embodiment. Descriptions of the information processing portions similar to those of the image forming apparatus 100 according to the first exemplary embodiment illustrated in FIG. 12 will be omitted.

When it is determined that NFC device ID information has been received (YES in step S116), in step S117, a CPU 101 stops timer counting processing to clear a timer value.

Then, in step S170, the CPU 101 displays a menu for selecting handling of the received NFC device ID information.

In steps S171, S172, S173, and S174, the CPU 101 detects a user's operation performed via a touch panel.

When it is determined that no user's operation performed via the touch panel has been detected (NO in step S171, NO in step S172, NO in step S173, and NO in step S174), the CPU 101 performs the following processing. Specifically, in a return to step S170, the CPU 101 displays the menu for selecting the handling of the received NFC device ID information.

When the user selects addition of a transmission destination address (YES in step S171), in step S119, the CPU 101 adds the received NFC device ID information to a transmission destination address used in a send function.

When the user selects addition of a storage destination box (YES in step S172) without selecting addition of the transmission destination address (NO in step S171), the CPU 101 performs the following processing. Specifically, in step S121, the CPU 101 adds a box related to the received NFC device ID information to a storage destination box.

When the user selects execution of pairing (YES in step S173) without selecting addition of a transmission destination address (NO in step S171) and without selecting addition of a storage destination box (NO in step S172), the CPU 101 performs the following processing. Specifically, in step S123, the CPU 101 transmits an IP address set in the image forming apparatus 100 to a mobile terminal 300.

When the user selects logging-out (YES in step S174) without selecting addition of the transmission destination address (NO in step S171), without selecting addition of the storage destination box (NO in step S172), and without selecting execution of pairing (NO in step S173), the CPU 101 performs the following processing. Specifically, in step S124, the CPU 101 executes log-out processing.

FIG. 19 is a diagram illustrating an example of a menu screen for selecting addition of a transmission destination address or a storage destination box, or execution of pairing based on the NFC device ID information displayed on an operation unit 120 of the image forming apparatus 100 of the fourth exemplary embodiment.

In a reception ID 1131, the NFC device ID information received via the NFC communication 700 is displayed. An "add to storage destination box" button 1132 is for instructing addition of the received NFC device ID information as a transmission destination address used in the send function. An "add to storage destination box" button 1133 is for instructing addition of a box related to the received NFC device ID information as a storage destination box. A "execute pairing" button 1134 is for transmitting an IP address set in the image forming apparatus 100 to the mobile terminal 300. A log out button 1135 is for instructing execution of log-out processing.

Thus, according to the present exemplary embodiment, the CPU 101 changes handling of the received information based on choice information about a button or the like selected by the user via the screen.

As a result, an operation intuitive for the user can be achieved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus capable of performing near field wireless communication, comprising:
   a display unit configured to display a screen;
   an acquisition unit configured to acquire information from an external device by using the near field wireless communication;
   a selecting unit configured to select a process that the information processing apparatus is to execute, from among a plurality of processes including at least a destination setting process for setting an address corresponding to the acquired information, as a destination of data, based on a screen ID of the screen that the display unit is displaying, when the acquisition unit acquires the information from the external device; and
   a processing unit configured to execute the process selected by the selecting unit,
   wherein the selecting unit selects the destination setting process, in a case where the screen ID of the screen that the display unit is displaying coincides with a screen ID of a send screen.

2. The information processing apparatus according to claim 1, wherein the plurality of processes at least includes a log out process.

3. The information processing apparatus according to claim 1, wherein the information processing apparatus is a printing apparatus.

4. The information processing apparatus according to claim 1,
   wherein in the destination setting process, an e-mail address corresponding to the acquired information is set as a destination of data.

5. The information processing apparatus according to claim 1,
   wherein the plurality of processes includes at least a box adding process for adding a box corresponding to the acquired information as a storage destination of a file, and
   wherein the selecting unit selects the box adding process, in a case where the screen ID of the screen that the display unit is displaying coincides with a screen ID of a box menu screen.

6. A method of performing near field wireless communication using an information processing apparatus, the method comprising:
- displaying a screen on a display unit;
- acquiring information from an external device by using the near field wireless communication;
- selecting a process that the information processing apparatus is to execute, from among a plurality of processes including at least a destination setting process for setting an address corresponding to the acquired information, as a destination of data, based on a screen ID of the screen that the display unit is displaying, when the acquiring acquires the information from the external device; and
- executing the process selected by the selecting,
- wherein the selecting selects the destination setting process, in a case where the screen ID of the screen that the displaying is displaying coincides with a screen ID of a send screen.

7. A non-transitory computer-readable storage medium that stores a program of instructions that when executed by a computer cause the computer to perform a method of near field wireless communication, the method comprising:
- displaying a screen on a display unit of the computer;
- acquiring information from an external device by using the near field wireless communication;
- selecting a process that the information processing apparatus is to execute, from among a plurality of processes including at least a destination setting process for setting an address corresponding to the acquired information, as a destination of data, based on a screen ID of the screen that the display unit is displaying, when the acquiring acquires the information from the external device; and
- executing the process selected by the selecting,
- wherein the selecting selects the destination setting process, in a case where the screen ID of the screen that the displaying is displaying coincides with a screen ID of a send screen.

8. A printing apparatus having a send function for sending data and capable of performing near field wireless communication, the printing apparatus comprising:
- a display unit configured to display a screen;
- an acquisition unit configured to acquire information from an external device by using the near field wireless communication;
- a selecting unit configured to select a process that the printing apparatus is to execute from among plural processes that include at least a destination setting process for setting an address corresponding to the acquired information as a destination of data, the selection being made upon the acquisition of the information from the external device by the acquisition unit; and
- a processing unit configured to execute the process selected by the selecting unit,
- wherein the selecting unit selects a process corresponding to a screen that is currently displayed by the display unit; and
- wherein the selecting unit selects the destination setting process, in a case where the screen that is currently displayed by the display unit is a screen corresponding to the send function.

9. The printing apparatus according to claim 8, wherein the plurality of processes at least includes a log out process.

10. The printing apparatus according to claim 8, wherein in the destination setting process, an e-mail address corresponding to the acquired information is set as a destination of data.

11. A method of performing near field wireless communication using a printing apparatus having a send function for sending data, the method comprising:
- displaying a screen on a display unit;
- acquiring information from an external device by using the near field wireless communication;
- selecting a process that the printing apparatus is to execute from among plural processes that include at least a destination setting process for setting an address corresponding to the acquired information as a destination of data, the selection being made upon the acquisition of the information from the external device by the acquiring; and
- executing the process selected by the selecting,
- wherein the selecting selects a process corresponding to a screen that is currently displayed by the display unit; and wherein the selecting selects the destination setting process, in a case where the screen displayed that is currently by the display unit is a screen corresponding to the send function.

12. A non-transitory computer-readable storage medium that stores a program of instructions that when executed by a computer cause the computer to perform a method of near field wireless communication, the computer having a send function for sending data, the method comprising:
- displaying a screen on a display unit;
- acquiring information from an external device by using the near field wireless communication;
- selecting a process that the computer is to execute from among plural processes that include at least a destination setting process for setting an address corresponding to the acquired information as a destination of data, the selection being made upon the acquisition of the information from the external device by the acquiring; and
- executing the process selected by the selecting,
- wherein the selecting selects a process corresponding to a screen that is currently displayed by the display unit; and
- wherein the selecting selects the destination setting process, in a case where the screen displayed that is currently by the display unit is a screen corresponding to the send function.

* * * * *